Sept. 29, 1936.  J. C. SÉAILLES  2,055,947
PROCESS FOR THE PRODUCTION OF CALCIUM ALUMINATE AND ALUMINA
Filed Nov. 2, 1934
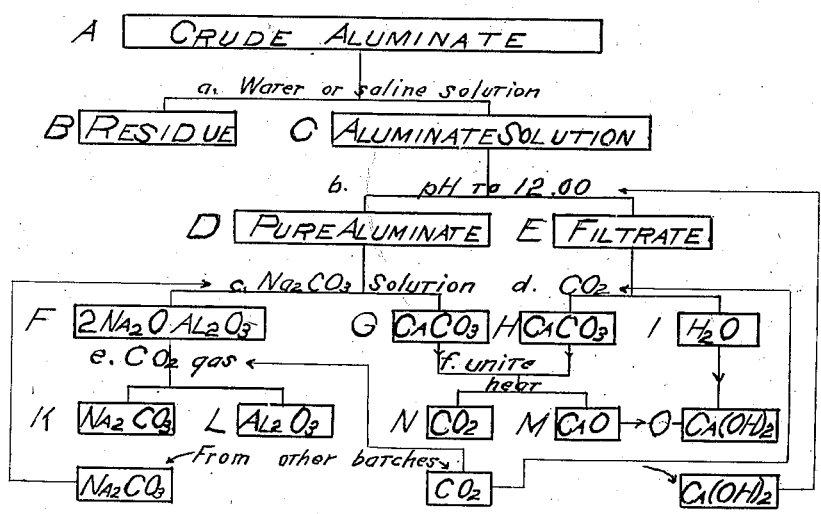
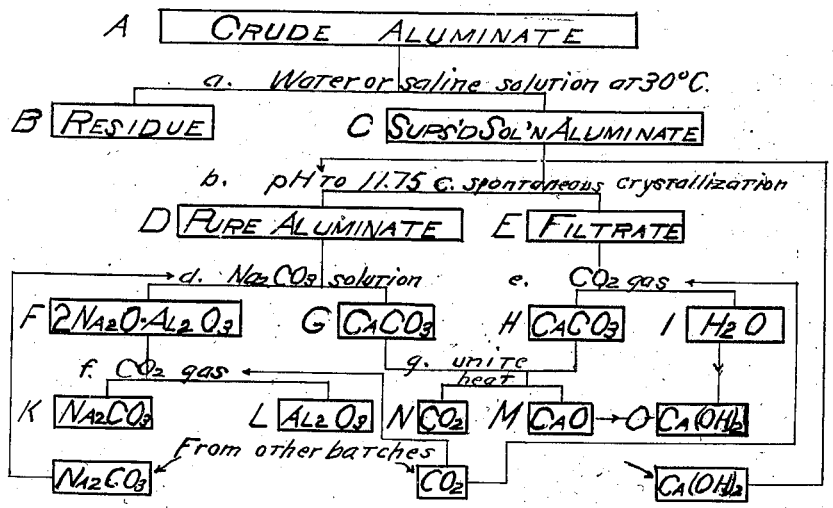

Patented Sept. 29, 1936

2,055,947

UNITED STATES PATENT OFFICE 2,055,947

PROCESS FOR THE PRODUCTION OF CALCIUM ALUMINATE AND ALUMINA

Jean Charles Séailles, Paris, France

Application November 2, 1934, Serial No. 751,237
In Luxemburg November 29, 1933

10 Claims. (Cl. 23—143)

This invention pertains to the preparation of calcium aluminate and alumina of very high purity.

One object of the invention is to manufacture calcium aluminate and alumina of almost perfect purity, ready for any technical or commercial use.

Another object of the invention is to so arrange the process used for the preparation of calcium aluminate and alumina that the loss of reagents shall be reduced to the minimum.

Another object of the invention is to arrange the steps of the process in a cycle so that not only the product of one step shall be the raw material for the next step, but that the by-products of each step shall become reagents for a preceding step in the application of the process to a succeeding batch of the crude material, whereby the loss of reagent material shall become very small.

This invention also pertains to the new industrial products manufactured, to the apparatus necessary for the performance of the process set forth, and the arrangement of the several units of that apparatus.

The process of the invention broadly stated, consists in treating a crude material containing calcium aluminate with water or a saline solution which dissolves the calcium aluminate itself, separating this solution from the undissolved material, removing the calcium aluminate from the said solution by any suitable means, for example by raising its pH to the neighborhood of 12.00, treating the so-obtained calcium aluminate with a solution of a carbonate of an alkali metal, whereby calcium carbonate is set free, and the aluminium units with the alkali metal to form an aluminate thereof, and freeing the alumina from this solution by any suitable process, for instance by means of carbon dioxide, $CO_2$.

The invention accordingly comprises the several steps and the relation of one or more of such steps to each of the others, the apparatus embodying features of construction, combinations and arrangements of parts adapted to effect such steps, and the product which possesses the characteristics, properties, and relation of constituents, all as exemplified in the detailed disclosure and drawing, herein set forth, and the scope of the invention will be indicated in the claims.

Accompanying this specification is a drawing which consists of flow sheets of the process of this invention.

In this drawing,

Figure 1 is a flow sheet of the process as performed without consideration of the temperature at which the several steps are performed, and Figure 2 is a flow sheet of a modification of the process in which certain steps of the process are performed at a definite temperature.

In both these figures, raw material and products are "boxed" and designated by capital letters, while steps of the process are not "boxed" and are designated by small letters.

According to the invention and more particularly according to those methods of application as well as the exemplification of the various parts thereof which are regarded as preferable, as, for example, to prepare alumina from crude calcium aluminate containing various impurities, one proceeds as follows, or in an analogous fashion.

Referring to the flow sheet of Figure 1, and ignoring, for the moment, and, for the sake of clearness of description, lines showing the return of various by-products to earlier steps, crude calcium aluminate, preferably in the anhydrous condition, is treated by an aqueous liquid which may consist either of pure water or of an alkaline solution of saline material which increases the solubility of the calcium aluminate, whereby a solution of pure calcium aluminate is obtained from the crude material. This solution is freed from the undissolved impurities and the calcium aluminate removed from the solution, either by permitting spontaneous crystallization or by raising the pH of the solution to the neighborhood of, for example, 12.00 or higher.

Spontaneous crystallization will occur if the solution is supersaturated, and in this case the pH will be 11.75 or thereabout.

If the solution be not saturated, the calcium aluminate will be precipitated by raising the pH of the solution to 12.00 or beyond.

This elevation of pH may be produced in any appropriate manner, notably by the addition of a solution of any alkaline substance but preferably by the addition of milk of lime, which has the advantage, among others, of not introducing foreign matter into the solution of the calcium aluminate.

Enough milk of lime may be added to remove practically all of the calcium aluminate, or, a small amount may remain dissolved. If, for instance, the solution contains an equal number of molecules of CaO and $Al_2O_3$, addition of sufficient milk of lime to increase the number of molecules of CaO to four or slightly more times that of the molecules of $Al_2O_3$, will cause all the calcium aluminate to be precipitated. A slight excess of calcium oxide will do no harm, in this instance.

Whatever the ratio between the numbers of molecules of calcium oxide and alumina in the solution, it suffices to adjust the amount of calcium added to obtain the optimum value of pH corresponding to the degree of precipitation sought.

Thus precipitates may apparently be obtained whose composition varies from $2CaO.Al_2O_3$ to $4CaO.Al_2O_3$, by varying the amount of CaO added. These precipitates are of sufficient purity for any technical use.

The term "saline material" or, "saline solution" as it is on the drawing, designates 1. Water which need not necessarily be chemically pure, but which may contain some of the impurities usually existing in industrial waters before or after their purification.

2. Water containing alumina and lime (together or separately) for instance residual waters from any previous operation according to the present invention.

3. Water in which calcium chloride has been dissolved so as to increase the solubility of aluminate of lime.

The mother liquor filtered from these precipitates will contain either calcium hydroxide alone, or calcium hydroxide and calcium aluminate, and may be purified by removal of the calcium by means of carbon dioxide in the well known manner, and may be re-utilized.

The alumina may be prepared from the calcium aluminate in any known manner, the preferred one being the following;

The purified calcium aluminate is treated with a solution of the carbonate of a metal of the alkali metal group, preferably sodium carbonate, and by this means a solution of the alkali metal aluminate, say sodium aluminate is obtained, and a residue of calcium carbonate. The aluminate solution is filtered off and carbon dioxide passed through it until the alumina is precipitated, and this is then filtered out, leaving the carbonate of the alkali metal again in solution.

The alumina obtained from this process is remarkably pure, since it is obtained from a product which has itself been dissolved from a purified material.

The carbonate of calcium which has been precipitated from mother liquor of the calcium aluminate as well as that precipitated from the solution of calcium aluminate by the alkali carbonate may be reutilized for the production of calcium oxide, as also the crude calcium aluminate undissolved from the crude material which may be again mixed with fresh material and pass through the process again.

The mother liquor from which the alumina has been removed consists of a solution of carbonate of the alkali metal and may be again used to prepare the alkali metal aluminate.

Thus the loss of alkali metal carbonate will be limited to the fraction adhering to the calcium carbonate, which fraction is so small as not to be worth recovering.

Another and better method or modification of that described above, is the following, which may be used independently.

In this modification, the extraction of the calcium aluminate from the crude material is performed at a temperature of about 30 degrees centigrade.

When solutions obtained from the crude aluminate by this method are supersaturated the calcium aluminate has a tendency to crystallize out, and this the more rapidly when the amount of supersaturation is greater. If crystallization begins before filtration, there is a loss, since the crystals then remain on the filter along with the undissolved matter from the crude material.

This rapid crystallization occurs both with cold and hot solutions, but, if the temperature of the solutions is maintained at 30 degrees centigrade, the phenomenon is then so slow that but a small amount of crystals has been formed at the end of some hours.

After the removal of these spontaneously formed crystals this modified process follows exactly the steps outlined above in the description of the process of Flow Sheet 1.

For the sake of clarity, in the above description, the return of by-products to the earlier steps has not been emphasized, and as a consequence the true nature of the invention has not been disclosed.

The process of this invention is a cyclic one, designed to run without intermission so long as the supply of crude material holds out, even for months, and it will now be described in accordance with the flow sheets disclosing this, omitting details which may be found above.

Batches of convenient amount, the size of which will depend in some cases upon the arbitrary choice of the workman, but more generally upon the capacity of the apparatus at his disposal, are removed in succession from a mass of crude calcium aluminate and started through the process steps at such intervals as to provide that products of later batches shall be available for reaction with by-products of earlier batches at the time that such by-products are available.

The first batch is subjected to the treatment with water, $a$, and, when a sufficient amount of calcium aluminate has been dissolved, the solution, C, is separated from the insoluble matter, B, which is then added to the next batch.

The pH of the solution C is then adjusted to the degree which will produce the degree of precipitation desired, using, for this purpose, the proper amount of calcium hydroxide in the form of milk of lime. The precipitate produced is pure calcium aluminate, D and is removed from the mother liquor, E, which contains, under ordinary working conditions, varying amounts of calcium and aluminium compounds, and is purified, by saturation with carbon dioxide which precipitates calcium carbonate, H.

This calcium carbonate, H is mixed with another amount G obtained from product D, as will be described hereinafter, and heated to drive off the carbon dioxide N and to obtain calcium oxide M.

This calcium oxide is then slaked by the water I producing milk of lime O and the milk of lime so produced is used to adjust the pH of solution C, in the step characterized $b$ on the flow sheet. This solution C is produced from a succeeding batch of raw material which has been started through the process at such a time as to produce this solution when the reagent or by-product is available for use with it.

Carbon dioxide N, or a part of it, is used to saturate filtrate E and another portion to saturate solution F, both derived from succeeding batches.

The precipitate of calcium aluminate D is digested in a solution of sodium carbonate whereby the calcium becomes the insoluble calcium carbonate G whose treatment is described above, and the aluminate is found in solution F as sodium aluminate.

This solution is saturated with carbon dioxide from N which may be that produced by the same batch, but more often would be that from subsequently operated on batches, whereby alumina forms the precipitate L and is removed from the mother liquor which is a solution of sodium carbonate, K.

This solution is re-used to digest the pure aluminate D provided by a subsequent batch.

The above description is limited, as seen, to Flow Sheet 1 and the process is carried on without attention to the temperature of solution, that is, without the temperature being fixed at any particular degree.

The same description will serve for flow sheet of Fig. 2, except for the fixation of the temperature to 30 degrees, centigrade, and the spontaneous crystallization. The cyclic nature of this modified process is exactly the same as outlined above.

As described and shown by the flow sheets, this process produces as its final product, alumina, but it is evident that the process can be interrupted at any time to produce calcium aluminate as its final product without losing its character as a cyclic process by using the subcombination steps $a$, $c$, $d$, $f$, $g$, $h$ and $o$ of Fig. 1, or steps $a$, $b$, $c$, $e$, $g$, $h$, $o$ and $p$ of Fig. 2, the products M, N, I, and O being re-used in the steps $b$ and $d$.

The reuse of these products is advantageous since the water I will contain varying amounts of material derived from the solution of crude aluminate unless the various steps are carried on in more nearly quantitative manner than is usually possible in technical work, and these materials are saved by this re-use.

Since either cyclic process is a continuing one, designed to run so long as the supply of crude material is unbroken, it is seen, that, when equilibrium is reached, that is, when a sufficient number of batches of crude material have been started through the process, there is always an intermediate product of one batch ready for each step of another one in which it can be employed, the loss of reagent is only substantially that of the sodium carbonate not removed by washing of the calcium carbonate G and returning these washings to solution of sodium aluminate F.

Since certain changes in carrying out the above process which embodies the invention may be made without departing from its scope, it is intended that all matter contained in the above description or shown in the accompanying drawing shall be interpreted as illustrative and not in a limiting sense.

It is also to be understood that the following claims are intended to cover all generic and specific features of the invention herein described and all statements of the scope of the invention which as a matter of language might be said to fall therebetween, and that they are intended to be inclusive in scope and not exclusive, in that other materials may be substituted in my process herein claimed without departing from the spirit of my invention.

I claim:

1. The cyclic process which comprises the separation of successive batches of convenient amount from a mass of crude material containing calcium aluminate, subjecting each batch, separately, at suitable intervals of time to an aqueous liquid which is a solvent of calcium aluminate, freeing the resulting solution of calcium aluminate from the undissolved residue, causing separation of calcium aluminate from said solution by raising its pH to a suitable degree by the addition of milk of lime thereto, submitting the calcium aluminate so separated to the action of a solution of sodium carbonate whereby a precipitate of calcium carbonate and a solution of sodium aluminate are formed, separating the said solution and saturating it with carbon dioxide whereby a precipitate of alumina and a solution of sodium carbonate are obtained, the milk of lime, the carbon dioxide and the sodium carbonate being by-products from other batches of the crude material containing calcium aluminate, whose treatment by this process has been so managed as to produce these by-products at the proper time for their use as reagents.

2. The modification of the process defined in claim 1 which consists in conducting the solution of calcium aluminate from the crude material at the temperature of 30 degrees centigrade, the filtration of the dissolved aluminate from the insoluble residue, the raising of the pH and the removal of the precipitated calcium aluminate from the filtrate at the same temperature.

3. The steps in the above described process which consist in dissolving calcium aluminate from a crude material containing it by means of an aqueous liquid of which the temperature is maintained in the neighborhood of 30 degrees centigrade, raising the alkalinity of the solution in such a manner as to carry its pH to the neighborhood of 12.00, thereby causing the precipitation of at least a part of the dissolved aluminate, and freeing the precipitate from the mother liquid.

4. The steps of the herein described cyclic process which comprise solution of calcium aluminate from a batch of crude material containing it in an aqueous liquid of which the temperature is maintained in the neighborhood of 30 degrees centigrade, separating the undissolved impurities from the solution raising the alkalinity of the solution, by the addition of milk of lime, so that the pH becomes in the neighborhood of 12.00, allowing the calcium aluminate to precipitate at least in part, removing and recovering this precipitate, precipitating the excess of lime from the said solution by means of carbon dioxide, separating the new precipitate and utilizing the so purified solution in dissolving a subsequent batch of the crude material.

5. The process of producing alumina herein described which comprises solution of calcium aluminate from a crude material containing the same, by an aqueous liquid, separating the undissolved impurities, precipitating at least in part the dissolved calcium aluminate, dissolving this precipitate in a solution of a carbonate of an alkali metal, separating therefrom the carbonate of calcium produced and treating the solution of alkali metal aluminate by carbon dioxide in such a way as to precipitate alumina.

6. The modification of claim 5 which consists in that the solution of calcium aluminate is so conducted that the solution resulting is supersaturated, and that the aluminate is removed from said solution by spontaneous crystallization.

7. The modification of the process defined by claim 1 which consists in conducting the solution of the calcium aluminate from the crude material at the temperature of thirty degrees centigrade, and the removal of the calcium aluminate from its solution by spontaneous crystallization.

8. The steps of the herein described cyclic process which comprise solution of calcium aluminate from a batch of crude material containing said aluminate, in an aqueous liquid the temperature of which is maintained in the neighborhood of 30° centigrade, separating the undissolved impurities from the solution and permitting the calcium aluminate to precipitate therefrom by spontaneous crystallization, separating this precipitate, precipitating the excess of lime from the residue liquid by means of carbon dioxide, removing the so-formed precipitate and utilizing the purified solution to dissolve a subsequent batch of the crude material.

9. The process of producing alumina herein described which comprises solution of calcium aluminate from crude material containing the same, by an aqueous liquid whose temperature is maintained in the neighborhood of 30° centigrade, separating the undissolved impurities, precipitating at least in part, the dissolved calcium aluminate, dissolving this precipitate in a solution of a carbonate of an alkali metal, separating therefrom the carbonate of calcium produced and treating the solution of alkali metal aluminate by carbon dioxide in such a way as to produce a precipitate of alumina.

10. The cyclic process which comprises segregating batches of convenient size from a mass of crude calcium aluminate material, dissolving out the calcium aluminate from each batch separately and successively, subjecting each such solution to a succession of steps so coordinated in time with steps from other batches that by-products of one batch can be used as reagents in other batches, which steps comprise adjustment of the pH of the solution to 12.00 by addition of calcium hydroxide solution thereto whereby the said solution is divided into a precipitate of pure calcium aluminate, and a solution comprising calcium hydroxide, formation of sodium aluminate and calcium carbonate by heating at least a part of said precipitate with a solution of sodium carbonate, precipitating calcium carbonate from the solution of calcium hydroxide last named, by passing carbon dioxide gas therethrough, uniting the two portions of calcium carbonate produced as above and heating to drive off the carbon dioxide, precipitating alumina and forming sodium carbonate by passing carbon dioxide gas through the sodium aluminate above produced, and forming calcium hydroxide by addition of water to the calcium oxide produced as above, the calcium hydroxide, sodium carbonate, carbon dioxide and water used as reagents in each batch being by-products of the treatment of other batches.

JEAN CHARLES SÉAILLES.